SEARCH ROOM

Cavity resonator having means for inserting and changing an oscillator tube

Nov. 25, 1952 L. L. MLYNCZAK 2,619,597

HIGH-FREQUENCY OSCILLATOR

Filed Dec. 18, 1945 2 SHEETS—SHEET 2

Plate-grid circuit is a re-entrant cavity. Plate-Cathode circuit is a coaxial type cavity, which is adjustable in electrical length.

INVENTOR.
LAWRENCE L. MLYNCZAK

BY Lawrence Glassman 230-30 SEARCH ROOM

Nov. 25, 1952 L. L. MLYNCZAK 2,619,597

HIGH-FREQUENCY OSCILLATOR

Filed Dec. 18, 1945 2 SHEETS—SHEET 1

INVENTOR.
LAWRENCE L. MLYNCZAK

BY William D. Hall
Attorney

SEARCH ROOM

Patented Nov. 25, 1952 2,619,597

UNITED STATES PATENT OFFICE 2,619,597

HIGH-FREQUENCY OSCILLATOR

Lawrence L. Mlynczak, West Allenhurst, N. J., assignor to the United States of America as represented by the Secretary of War Application December 18, 1945, Serial No. 635,825

9 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to ultra-high-frequency oscillators and more particularly to unitary oscillator structures incorporating miniature vacuum tubes.

Numerous applications exist for a self-sufficient oscillator structure of highly compact and lightweight design, and characterized by a high order of electrical efficiency. For example, in a radiosonde system, wherein a radio transmitter is borne aloft by a balloon, considerations of weight as well as efficiency are important in the selection of a suitable oscillator.

There are two main factors limiting the output and efficiency of a vacuum tube in a high frequency circuit as the operating frequency is raised above a certain level: first, the inductance and capacitance associated with the tube electrodes and their internal leads, which effect is in the nature of circuit limitations incurred by the presence of the tube and, second, the electron transit time affecting the electronic mechanism of the tube and its ability to generate oscillations.

Due to these limitations vacuum tubes designed for ultra-high-frequency operation have been greatly reduced in size. Electrode leads have been designed with an aim to reducing their inductances and the electrodes have been arranged with a view to minimizing the inter-electrode capacities.

In order to take full advantage of these miniature type tubes the resonant structures associated with the tube must be of high "Q" and adapted to make direct connection with the tube electrodes. With this requirement in view it is the primary object of the present invention to provide a new and improved ultra-high-frequency oscillator structure incorporating a miniature tube wherein high "Q" resonators are arranged to make direct connection with the tube terminals. More specifically, it is an object of the invention to provide a tunable ultra-high-frequency oscillator structure of compact, sturdy and efficient design adapted to inexpensive manufacture.

For a complete understanding of the invention, as well as other objects and further features thereof, reference is had to the following detailed description to be read in connection with the accompanying drawings wherein like components are designated by like numerals. The scope of the invention will be pointed out in the annexed claims.

Figures 2, 3, 4:
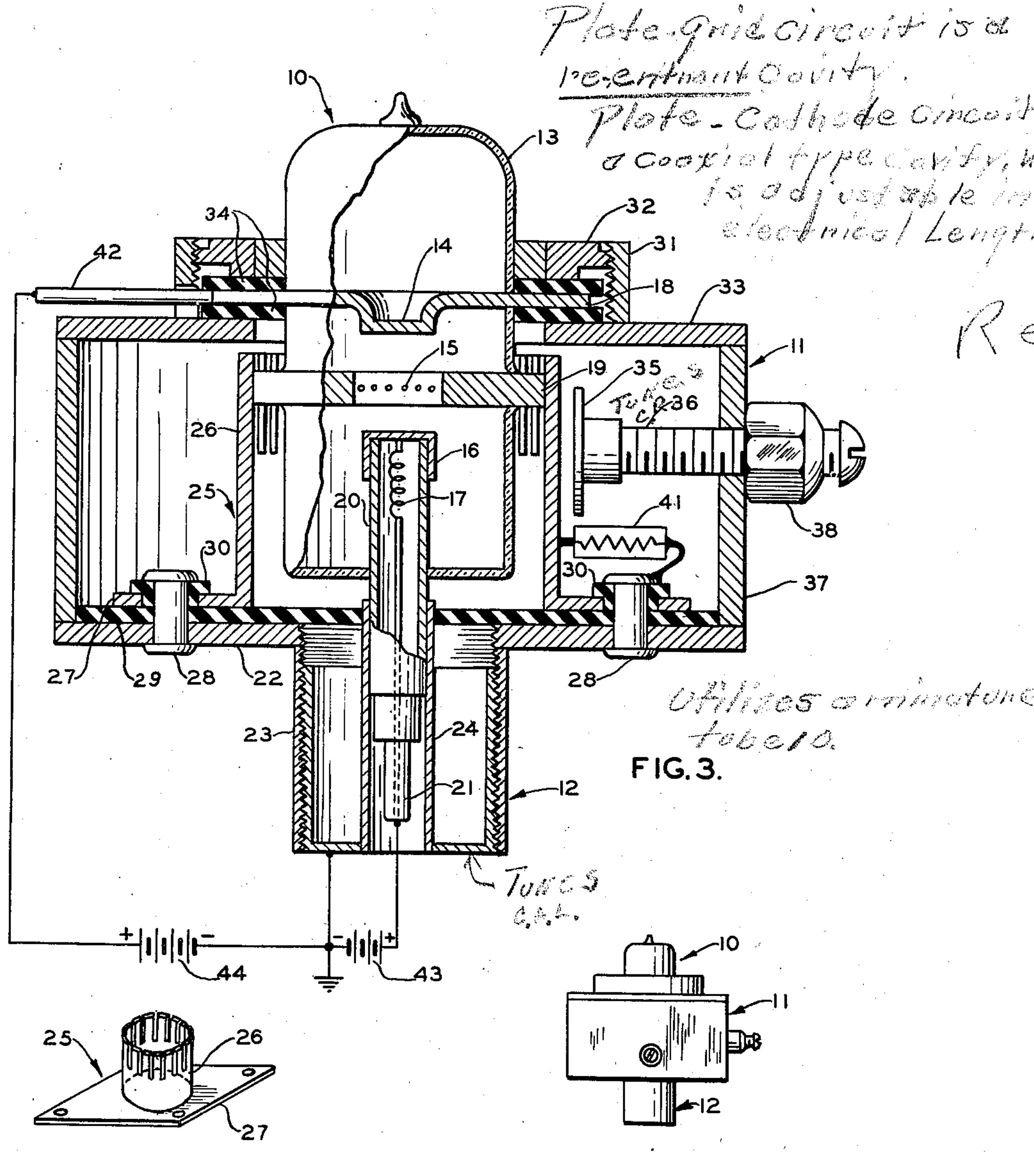
Figure 2 is an elevational view of said first embodiment.
Figure 3 is a longitudinal section taken through said first embodiment.
Figure 4 shows separately, in perspective, a detail of said first embodiment.
Figure 1:
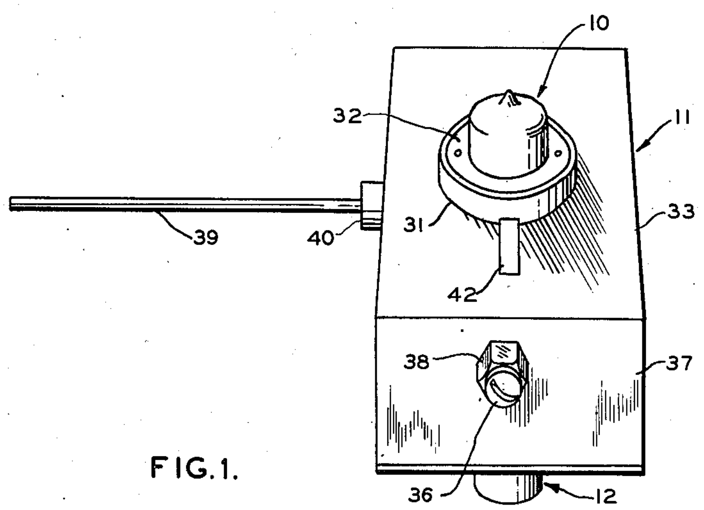
Figure 1 shows, in a perspective view, a first preferred embodiment of a unitary oscillator structure in accordance with the invention.

Referring now to the drawings, and more particularly to Figs. 1–4, there is shown an oscillator structure comprising three main elements, namely, a miniature vacuum tube 10, a resonant chamber 11 of rectangular cross section, and a coaxial line 12.

Vacuum tube 10, which is shown partially exposed and sectioned in Fig. 3, is preferably a miniature triode of co-planar construction, such as the Sylvania type SB/846, and includes within a generally cylindrical vitreous envelope 13 in a co-planar symmetrical arrangement, an anode 14, a grid electrode 15, and a cathode 16 having an internal heater 17. Disc-shaped terminals 18 and 19 are provided for the anode 14 and grid 15 respectively, the diameter of anode terminal 18 being relatively large with respect to grid terminal 19. Cathode 16 takes the form of a cap and is mounted at one end of a metal tube 20, which projects below envelope 13 to act as cathode terminal. Extending from the terminal end of metal tube 20, but insulated therefrom, is a prong 21 connected to one side of heater 17 and serving as one heater terminal, tube 20 serving as the other heater terminal. It is to be understood that the invention is not limited to the specific triode of the type illustrated, the invention being fully operable with other forms of miniature tubes.

Coaxial line 12 is centrally mounted upon the bottom wall 22 of chamber 11 and consists of an internally threaded, outer pipe 23 integral with bottom wall 22, and a re-entrant inner pipe 24 externally threaded, thereby enabling axial movement of the inner pipe within the outer pipe. A circular opening is cut into bottom wall 22 whose circumference is aligned with the inner circumference of outer pipe 23.

Triode 10 is seated within chamber 11, metal tube 20, which acts as cathode connection, being snugly received within inner pipe 24 to make good electrical contact thereto. Triode 10 is maintained in position within chamber 11 by means of a grid terminal support 25 (shown separately in Fig. 4), consisting of a metal cylinder 26 having longitudinal slots cut therein at one end to form resilient fingers for engaging the periphery of grid terminal 19, said cylinder being vertically mounted on a rectangular base 27. Base 27 is mechanically secured to bottom wall 22 by means of four metal rivets 28, two thereof being visible in Fig. 3;

Bottom wall 22 is electrically insulated from base 27 by means of a rectangular insulator plate 29, preferably fabricated of mica, interposed therebetween, and the rivets 28 are insulated from base 27 by means of suitable insulating grommets 30.

Secured to the upper wall 33 of chamber 11 and concentric with a centrally disposed circular opening therein whose diameter is just sufficient to admit grid terminal 19 of triode 10 but not anode terminal 18, is an internally threaded metal collar 31. Threadibly received in collar 31 is a ring clamp 32 which acts to mechanically secure the anode terminal disc 18 to the upper wall 33, the anode terminal being sandwiched between two insulation washers 34, preferably of mica, serving to insulate the anode for direct-current from the upper wall 33. The capacity existing between anode terminal 18 and upper wall 33, insulation washers 34 being the dielectric therebetween, is such that its impedance at the oscillator frequency provides in effect an R-F short.

Tuning of chamber 11 is accomplished by means of a circular tuning plate 35 affixed to the end of a machine screw 36, threadibly received in side wall 37, and projecting into chamber 11. Rotation of screw 36 serves to vary the capacitative relation existing between side wall 37 and grid cylinder 26, thereby altering the resonant characteristic of chamber 11. An elastic stop nut 38 prevents play in screw 36 or undesired movement due to vibration.

Oscillations are extracted from chamber 11 and applied to an antenna rod 39, supported by an insualtor 40 mounted on one side wall of cavity 11. Energy for antenna 39 is obtained by a suitable coupling loop (not shown) inserted into chamber 11. A grid-leak resistor 41 is connected between grid cylinder 26 and a rivet 28. Plate voltage is applied to anode terminal 18 by means of a metal tab 42 extending to the terminal through a notch cut in collar 31. Filament voltage is supplied by an "A" battery 43 having one pole connected to prong 21, through a suitable socket (not shown), and the other pole to ground. Plate voltage is supplied by "B" battery 44 whose positive pole is connected to tab 42 and whose negative pole is grounded. The case of the oscillator structure is maintained at ground potential.

The electrical circuit of the oscillator is of conventional design, being essentially composed of an anode-grid resonator in the form of a re-entrant cavity, and a grid-cathode resonator in the form of a coaxial line. The re-entrant cavity is defined by rectangular chamber 11 in combination with grid support 25, anode 14 of triode 10 serving to complete upper wall 33 of the chamber. The coaxial line, grid-cathode resonant circuit consists of coaxial line 12 which is extended by metal tube 20 within grid cylinder 26, the entire length of the combination being the length of the coaxial line resonator. Grid cylinder 26 may be regarded as an extension of the outer pipe 23 of coaxial line 12, by reason of the capacitative coupling existing between base 27 and bottom wall 22, insulator 29 acting as a dielectric therebetween, the capacitative coupling providing a low impedance path for radio frequencies. Oscillations are sustained by reason of feedback effected between the anode-grid and grid-cathode circuits through the slot in the grid-cathode coaxial line provided by the presence of insulator 29, the degree of feedback being largely determined by the thickness of insulator 29. The grid-cathode circuit may be tuned by rotating inner pipe 24 within outer pipe 23 of coaxial line 12, thereby varying the effective electrical length of the grid-cathode coaxial line.

In the event of tube failure, tube 10 may be readily removed by unscrewing ring clamp 32 and then withdrawing the tube. The structure is preferably fabricated of silver-plated brass, and is adapted because of its simplicity to large-scale production. It is obvious that the operating frequency of the oscillator is mainly determined by the dimensions of chamber 11, and it has been found in practice that structures of this type may be designed to operate up to 3000 megacycles. With the tuning arrangement as shown, it has been found that the frequency can be varied in a range of approximately 100 megacycles.

Figure 5:
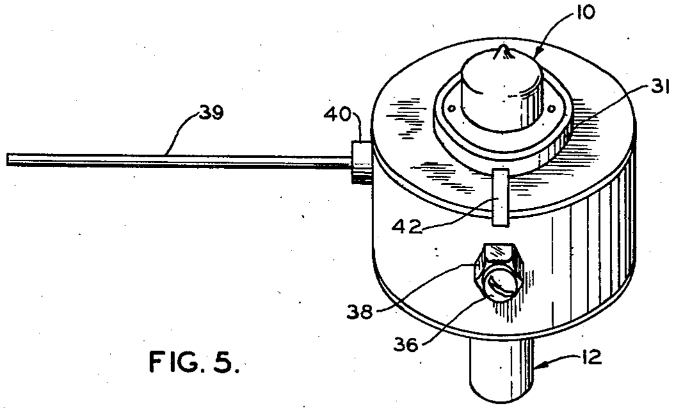
Figure 5 shows, in a perspective view, a second preferred embodiment of a unitary oscillator structure in accordance with the invention.

In the embodiment disclosed in Figs. 1–4, chamber 11 has been shown as being of the rectangular type. The invention also is fully operable with resonant cavities of circular cross section, as shown in Fig. 5, which is identical in all details with the first embodiment, except that in this instance the chamber 45 is circular.

While there has been shown what is at present considered preferred embodiments of the invention, it is obvious that many changes and modifications may be made therein without departing from the invention.

What is claimed is:

1. A high frequency oscillator comprising a re-entrant cavity resonator including an upper wall, a side wall and a bottom wall, said bottom wall having a re-entrant cylindrical section slotted at one end and concentric with said cavity, an electronic discharge device disposed within said cavity concentric with said re-entrant section, said discharge device including in axial succession a cylindrical cathode terminal, a substantially disc-shaped grid terminal and a substantially disc-shaped anode terminal, said anode terminal being capacitatively connected for high frequencies to said upper wall, said grid terminal being received in the slotted end of said re-entrant section and in contact therewith, the slots in the slotted end of said re-entrant section having an axial length that is substantially greater than that of said grid terminal, a coaxial line resonator including cylindrical inner and outer conductors, the outer conductor being vertically mounted on said bottom wall, said re-entrant section forming an electrical extension of said outer conductor, the inner conductor being adapted to receive said cathode terminal, a dielectric interposed between said bottom wall and said re-entrant section thereof, means in said re-entrant cavity resonator for varying the capacity between said re-entrant section and said side wall, and means for varying the effective electrical length of said coaxial line resonator.

2. A high frequency oscillator, comprising a cavity resonator including an upper wall, side wall and bottom wall, a re-entrant cylindrical section concentric with said cavity and having its inner end slotted, an electronic discharge device

SEARCH ROOM disposed within said cavity and concentric with said re-entrant section, said discharge device including in axial succession a cylindrical cathode terminal, a substantially disc shaped grid terminal and an anode terminal, said grid terminal being in contact with and supported by the slotted end of said re-entrant section, the slots in the slotted end of said re-entrant section having an axial length that is substantially greater than that of said grid terminal, said cylindrical section being vertically mounted at its outer end on said bottom wall, said cylindrical section being insulated for direct current from said bottom wall, and resonator means coupled to said cathode terminal.

3. A high frequency structure including: a cavity resonator, having a main cavity and a re-entrant portion; an electronic discharge device disposed within said resonator and including an anode, a cathode, and a grid; the inner end of said re-entrant portion having a plurality of slots therein, a portion of said grid being adapted to be received by said slotted end; said slots having an axial length that is substantially greater than that of the portion of said grid received by said slotted end; and resonator means connected to said cathode, including said re-entrant portion which forms an extension thereof.

4. A high frequency structure including: a cavity resonator, having a main cavity, and a re-entrant portion, the inner end of said re-entrant portion having a plurality of slots therein, the slotted end of said re-entrant portion being adapted to receive the grid of an electronic discharge device, the axial length of said slots being substantially greater than that of the portion of said grid received by said slotted end.

5. The structure of claim 4, and further including resonator means coupled to said re-entrant portion, said re-entrant portion forming an extension of said resonator means.

6. The structure of claim 5, wherein said resonator means comprises a coaxial line and an element therein for rendering said line resonant.

7. The structure of claim 6, wherein a dielectric element separates said re-entrant portion from said main cavity and from said resonator means.

8. The structure of claim 7, further including means for varying the resonant frequency of said resonator means; and means for varying the capacitance between said re-entrant portion and said main cavity.

9. The structure of claim 4, and further including means for clamping said discharge device to the top wall of said main cavity.

LAWRENCE L. MLYNCZAK.

REFERENCES CITED

The following references are of record in the file of this patent:

UNITED STATES PATENTS

| Number | Name | Date |
|---|---|---|
| 2,088,722 | Potter | Aug. 3, 1937 |
| 2,412,805 | Ford | Dec. 17, 1946 |
| 2,412,892 | Krasik | Dec. 17, 1946 |
| 2,416,567 | McArthur | Feb. 25, 1947 |
| 2,456,422 | James | Dec. 14, 1948 |
| 2,462,866 | Hotine | Mar. 1, 1949 |